UNITED STATES PATENT OFFICE.

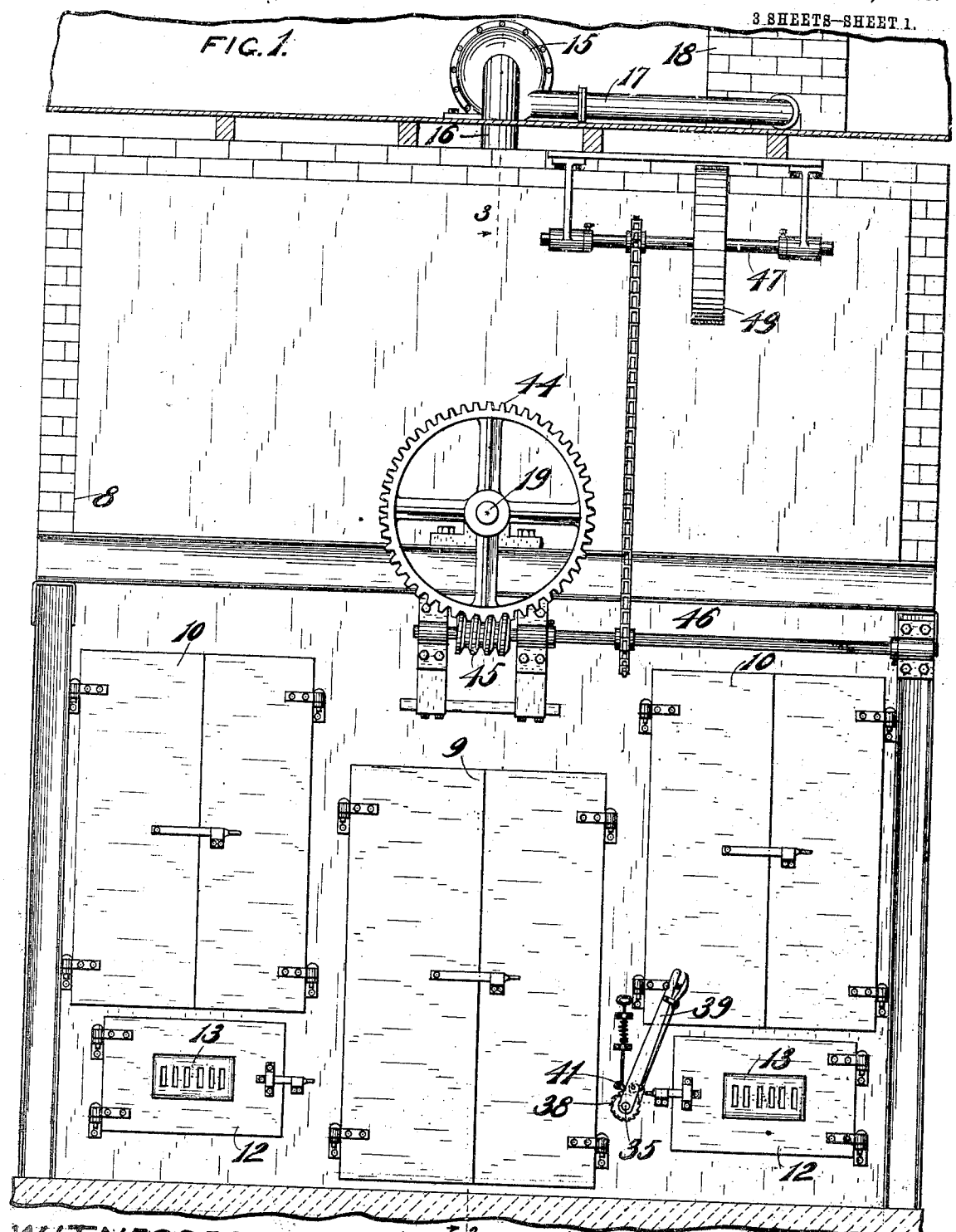

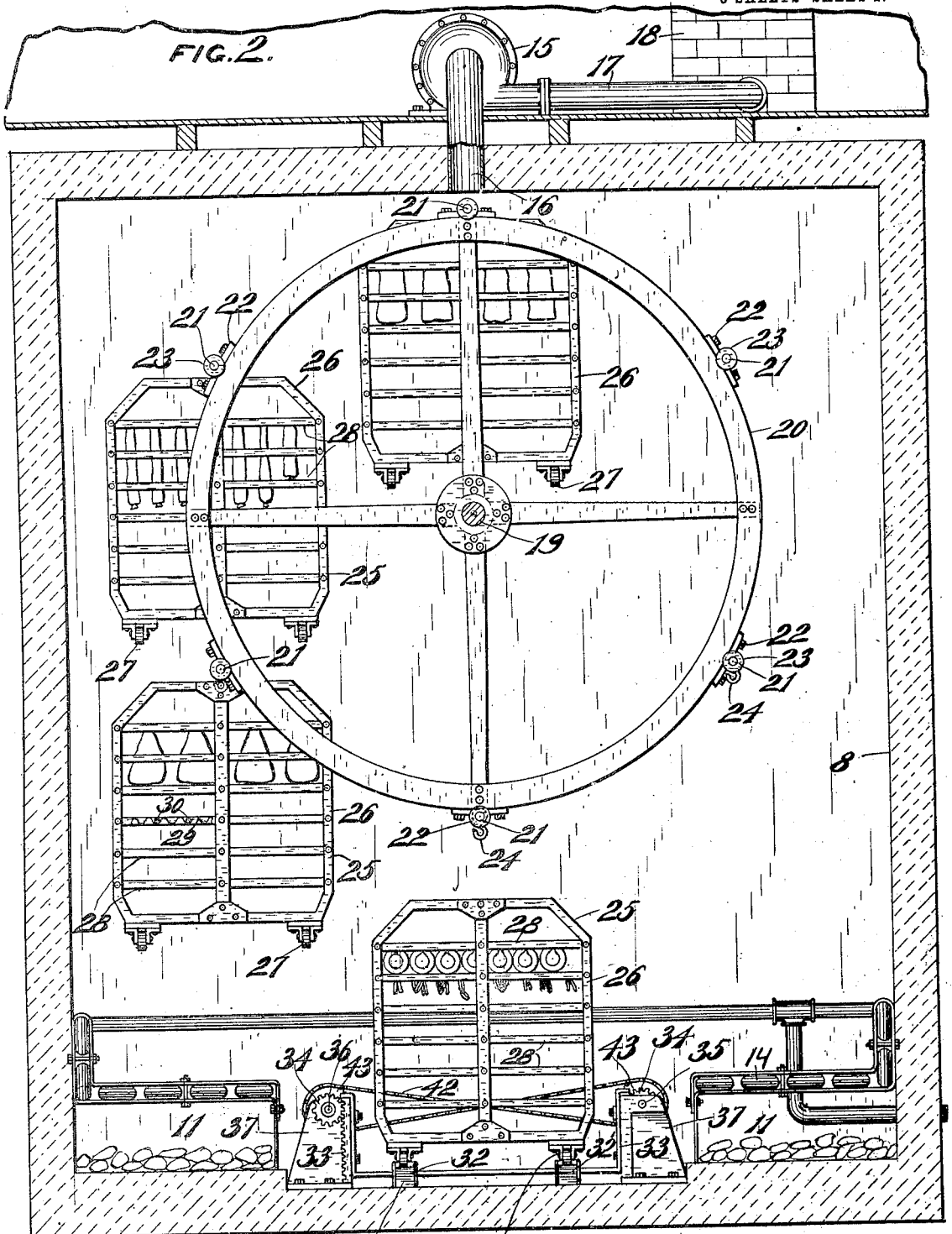

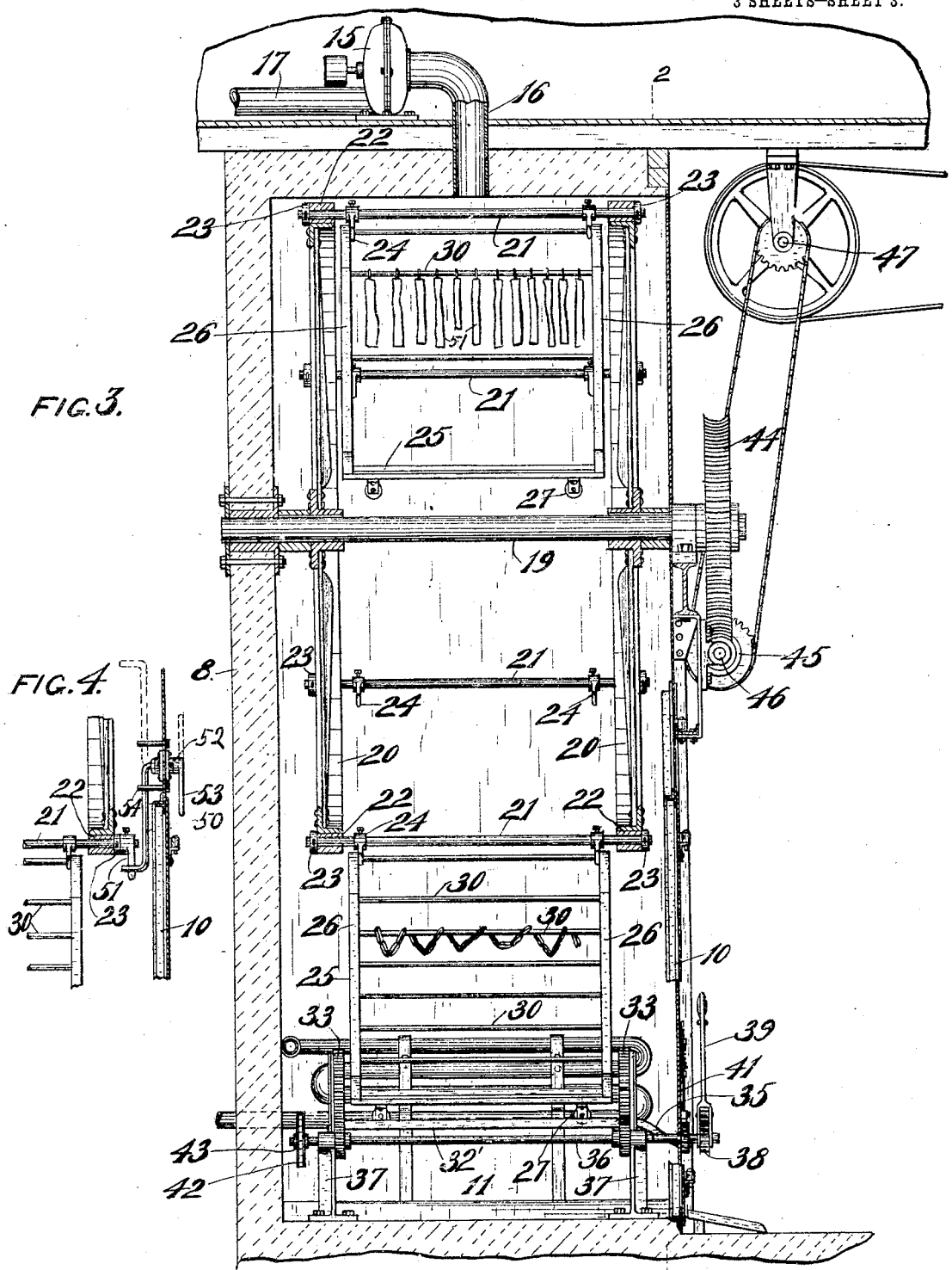

FRED USINGER, OF MILWAUKEE, WISCONSIN.

MEAT-SMOKING MACHINE.

1,053,249.  Specification of Letters Patent.  Patented Feb. 18, 1913.

Application filed February 14, 1910, Serial No. 543,824. Renewed August 2, 1912. Serial No. 713,004.

*To all whom it may concern:*

Be it known that I, FRED USINGER, residing in Milwaukee, in the county of Milwaukee and State of Wisconsin, have invented new and useful Improvements in Meat-Smoking Machines, of which the following is a description, reference being had to the accompanying drawings, which are a part of this specification.

This invention relates to improvements in meat smoking machines and more particularly to that class of machines used for smoking sausage, hams, bacon, etc.

One of the objects of this invention is to provide a meat smoking machine which is simple in construction and operation and which is adapted to smoke all of the parcels of meat evenly and obviates the necessity of rehandling and possibility of breaking the parcels of meat during the process of smoking.

A further object of the invention is to provide a meat smoking machine which is adapted to smoke a large amount of meat at one time in an efficient manner.

A further object of the invention is to provide a meat smoking machine with means adapted to thoroughly dry the parcels of meat during the process of smoking and to withdraw damp air when desired from the inclosure within which the meat is contained while being smoked.

With the above, and other objects in view, the invention consists of the meat smoking machine and its parts and combinations and all equivalents thereof.

In the accompanying drawings in which the same reference characters indicate the same parts in all of the views: Figure 1 is a front elevation of the complete meat smoking machine; Fig. 2 is a vertical sectional view thereof taken on line 2—2 of Fig. 3, a part of one of the meat trucks being broken away to show interior construction; Fig. 3 is a vertical sectional view thereof taken on line 3—3 of Fig. 1; and, Fig. 4 is a detail view of a modified part.

Referring to the drawings the numeral 8 indicates an inclosure or smoke chamber and 9 the medial doors and 10 the side doors opening thereto. This inclosure serves as a room or chamber in which the parcels of meat to be smoked are placed and it is provided with two fire places 11 for burning material to produce the smoke. Doors 12 provide access to these fire places and dampers 13 in the doors admit the necessary air for combustion to the fires. The inclosure is provided with heating coils 14 positioned over the fire places which are adapted to dry the parcels of meat within the chamber and when the air within the chamber becomes too moist it is withdrawn by means of a ventilating fan 15 positioned above the inclosure and connected thereto by a pipe 16. A pipe 17 extends from the fan to the chimney 18. The fan may be driven in any suitable manner desired. A main shaft 19 mounted in bearings in the walls of the inclosure has connected thereto two wheels 20 spaced apart and connected together at their peripheries by transversely positioned supporting rods 21 revolubly mounted in bearings 22 bolted to the rims of the wheels. The ends of the supporting rods are provided with collars 23 to prevent endwise movement. The supporting rods also have eyed hooks 24 rigidly connected thereto and positioned between the wheels which are adapted to connect to and support trucks 25 which have been moved into the path of travel of said hooks.

Each truck consists of a pair of upstanding rectangular frames 26 formed of metal and connected together at their lower portions and mounted on rollers 27. The rectangular frames are provided with cross tangular frames are provided with cross slats 28 having recessed or corrugated ribs 29 extending from their inner surfaces which are adapted to space apart and support rods 30 upon which the parcels of meat 31 are supported.

The trucks are raised into position to be engaged by the hooks 24 by means of an elevator 32 provided with track-ways 32' positioned below the wheels and within the inclosure and operated by racks 33, forming part of the elevator, meshing with the pinions 34 mounted on shafts 35 and 36 which have their bearings in standards 37. The shaft 35 is of greater length than the shaft 36 and extends through the front wall of the inclosure and is provided with a ratchet wheel 38. An operating lever 39 straddling the ratchet wheel and mounted on the shaft 35 is provided with a spring actuated pawl 40 positioned to engage the teeth of the ratchet wheel. A spring actuated locking pawl 41 serves to hold the ratchet wheel in positions of adjustment. A crossed sprocket chain 42 extending around sprocket wheels 43 mounted on the shafts 35 and 36 connects the two shafts together so they may both be operated by the one operating lever.

The main shaft 19 extends through the walls of the inclosure and at one end is provided with a worm wheel 44 which is in mesh with a worm 45 mounted on a shaft 46. The shaft 46 is driven from a countershaft 47 by a sprocket chain and wheel connection 48 and the countershaft is driven by a belted connection 49 with a source of power.

In the modified form shown in Fig. 4 provision is made for automatically unhooking the trucks from the transversely positioned bars 21 by means of a cranked lever 50 positioned within the chamber and the cranked arm of which is adapted to be moved into the path of movement of depending arms 51 rigidly connected to the transverse rods at one end. The cranked lever 50 is mounted on the end of a short shaft 52 which extends through the wall of the chamber and is provided with an operating lever 53 on its outer end. A stop pin 54 is positioned below the short shaft and is adapted to hold the cranked lever in engaging position to unhook the hooks from the trucks. In connecting the hooks to the trucks the cranked lever is swung upwardly and the hooks will engage the trucks moved into their paths of movement and they will be carried around by the wheels.

The operation of the machine is as follows: The parcels of meat to be smoked such as ham, bacon or sausage are suspended from the rods supported on the corrugated ribs forming part of the truck, the corrugations providing for the proper spacing of the parcels apart. As soon as each truck is completely filled with the parcels or pieces of meat it is pushed through the medial doorway into the smoke chamber and on to the tracks of the elevator. The operating lever is then moved back and forth to turn the pinions and raise the elevator and the car resting thereon. When the truck has been elevated to the proper height the hooks of one of the transverse bars are hooked under the cross bar of the truck and the main shaft and wheels are turned by power to lift the truck from the tracks of the elevator. The elevator is lowered at the same time and the other trucks are rolled into the chamber, elevated and connected to the transverse bars until each bar is provided with a truck full of parcels or pieces of meat and the doors are then closed. In the meantime the fires have been started in the fire places to produce the smoke desired and the main shaft is revolved to successively lift each truck to the upper part of the chamber and then down to the lower part thereof so that the parcels of meat on each truck will be subjected to the same amount of smoke density which may vary with the different degrees of altitude within the chamber. The transverse rods are so spaced with relation to each other and to the main shaft that the trucks are permitted to swing over the transverse rod immediately below the rod to which the truck is connected and also over the main shaft without striking thus keeping the trucks always in upright position. The parcels of meat are examined from time to time through the side doors and if the meat is found to be more moist than desired steam is turned onto the steam coils to dry the same and if the air is also found to be too moist it is drawn off by means of the ventilating fan and discharged into the chimney and a fresh supply permitted to enter through the draft doors or the other doors. When the parcels of meat have been sufficiently smoked the rotation of the main shaft is stopped with one of the trucks in the lowermost position, the operating lever is then moved to raise the elevator until the lower truck is supported thereon and when the hooks are disengaged from the truck the elevator is lowered and the truck is rolled out of the chamber and the parcels of meat removed therefrom. The main shaft is again turned to bring another truck to the lower position and the elevator is raised as before and the operations repeated until all of the trucks have been removed from the chamber.

The operation of the modified form is similar to the principal form with the exception that the hooks are automatically engaged and disengaged from the trucks by the cranked arm and the transverse rod arms.

From the foregoing description it will be seen that the machine is very simple in construction and operation and is well adapted to smoke the parcels of meat in an efficient even manner without liability of breaking the parcels.

What I claim as my invention is:

1. A meat smoking machine, comprising a smoke chamber, trucks adapted and constructed to be moved into the chamber and provided with means for supporting pieces of meat, means for elevating the trucks into the path of movement of a revoluble member, and a revoluble member for engaging the trucks and elevating and lowering said trucks while the pieces of meat are being smoked.

2. A meat smoking machine, comprising a smoke chamber, an elevator within the chamber, trucks adapted and constructed to be moved on the elevator in the chamber and provided with means for supporting pieces of meat, and a revoluble member for engaging the trucks when moved into the path of movement of the revoluble member by the elevator and also for elevating and lowering said trucks while the pieces of meat are being smoked.

3. A meat smoking machine, comprising a smoke chamber provided with doors opening thereto, a fire place within the chamber, an elevator within the chamber, trucks adapted and constructed to be moved on the elevator within the chamber and provided with means for supporting pieces of meat, and a revoluble member having transversely positioned rods provided with truck engaging means which are adapted to engage trucks moved into the path of movement of the engaging means by the elevator and also for elevating and lowering said trucks while the pieces of meat are being smoked.

4. A meat smoking machine, comprising a smoke chamber provided with doors opening thereto, a fireplace within the chamber, an elevator within the chamber, heating coils positioned in said chamber, a fan having communication with said chamber for withdrawing the moist air therefrom, trucks adapted and constructed to be moved on the elevator within the chamber and provided with means for supporting pieces of meat, and a revoluble member having transversely positioned rods provided with truck engaging means which are adapted to engage trucks moved into the path of movement of the engaging means by the elevator and also for elevating and lowering said trucks while the pieces of meat are being smoked.

5. A meat smoking machine, comprising a smoke chamber provided with doors opening thereto, a fireplace within the chamber, a shaft extending across the chamber, wheels spaced apart and mounted on said shaft, rods connected to the wheels and spaced a distance apart, removable holding trucks suspended from said rods and adapted and constructed to swing over the rods immediately below the rods to which the members are connected and also over the shaft, said trucks provided with meat holding means, and means, for rotating the wheels.

6. A meat smoking machine, comprising a smoke chamber provided with doors opening thereto, a fire place within the chamber, a shaft extending across the chamber, wheels spaced apart and mounted on said shaft, rods connected to the wheels and spaced a distance apart, meat holding members suspended from said rods and adapted and constructed to swing over the rods immediately below the rods to which the members are connected and also over the shaft, an elevator within the chamber for elevating the meat holding members into position to be engaged by the rods connected to the wheels, and means for rotating the wheels.

7. A meat smoking machine, comprising a smoke chamber provided with doors opening thereto, a fire place within the chamber, a wheel mounted within the chamber and provided with means for detachably engaging meat holding members, an elevator within the chamber for elevating the meat holding members into position to be engaged by the wheel, means exteriorly of the chamber for operating the elevator, means for heating the chamber, means for withdrawing the moist air from the chamber, and means for rotating the wheel.

8. A meat smoking machine, comprising a smoke chamber provided with doors opening thereto, means for introducing smoke within the chamber, a shaft extending across the chamber and extending through one of the chamber walls, wheels spaced apart and mounted on the shaft, rods connected to the wheels and spaced a distance apart, trucks detachably connected to the rods and adapted and constructed to swing over the rods immediately below the rods to which the trucks are connected and also over the shaft, an elevator for elevating the trucks into position to be engaged by the rods, means exteriorly of the chamber for operating the elevator, means for heating said chamber, a fan for withdrawing moist air from the chamber, a worm wheel mounted on the shaft, a worm in mesh with said gear, and means for rotating the worm.

9. A truck for a meat smoking machine, comprising a pair of upstanding frames provided with cross slats having recessed ribs extending from their inner surfaces, the recessed portions of said ribs opening upwardly and meat supporting rods extending from one frame to the other and spaced apart and supported on said ribs and entering said recesses.

In testimony whereof, I affix my signature, in presence of two witnesses.

FRED USINGER.

Witnesses:
 W. J. KRAUTHOEFER,
 ALMA A. KLUG.